US005185046A

United States Patent [19]

Perez

[11] Patent Number: 5,185,046

[45] Date of Patent: Feb. 9, 1993

[54] METHOD FOR NON-DESTRUCTIVE ESTIMATION OF WAVEGUIDE DIRECTIONAL COUPLER DIMENSIONS

[75] Inventor: Raul M. Perez, Pomona, Calif.

[73] Assignee: The United States of America as represented by the Administrator of the National Aeronautics and Space Administration, Washington, D.C.

[21] Appl. No.: 781,521

[22] Filed: Oct. 22, 1991

[51] Int. Cl.[5] .............................................. B32B 31/00

[52] U.S. Cl. ....................................... 156/64; 156/279

[58] Field of Search .................. 156/64, 278, 279, 294

[56] References Cited

U.S. PATENT DOCUMENTS

| | | | |
|---|---|---|---|
| 1,568,876 | 1/1926 | Campbell | 33/561.2 |
| 2,416,441 | 2/1947 | Grant | 73/151 |
| 2,541,910 | 2/1951 | Bangert | 333/113 |
| 2,848,691 | 8/1958 | Harkless | 333/113 |
| 4,192,176 | 3/1980 | Barringer | 73/28.04 |

*Primary Examiner*—David A. Simmons
*Assistant Examiner*—J. Sells
*Attorney, Agent, or Firm*—Thomas H. Jones; John H. Kusmiss; Guy M. Miller

[57] ABSTRACT

A method for estimating the size and location of couplings within a waveguide directional coupler is provided. The method is applied to a waveguide directional coupler having a main transmission waveguide connected to an auxiliary transmission waveguide by a plurality of bore hole couplings. The bore hole couplings are in the interior of the waveguide directional coupler and, therefore, are not easily measurable. The invention provides a simple and inexpensive method for measuring the size and location of the couplings without dismantling or destroying the waveguide directional coupler. The method generally includes the steps of applying a two-sided tape to a member, inserting and securing the member within the main transmission waveguide, with the two-sided tape adjacent to the bore hole couplings, pouring a fine particulate substance such as talc into the auxiliary transmission waveguide such that a portion of the talc enters the bore hole couplings and adheres to the two-sided tape, and withdrawing the member such that the size and location of the bore hole couplings can be determined by measuring the size and location of marks on the two-sided tape caused by the fine particular substance adhering to the two-sided tape. In this manner, the dimensions of the bore hole couplings within the waveguide directional coupler are easily determined without the need for dismantling or destroying the waveguide coupler, and without the need for any expensive X-ray techniques.

13 Claims, 2 Drawing Sheets

METHOD FOR NON-DESTRUCTIVE ESTIMATION OF WAVEGUIDE DIRECTIONAL COUPLER DIMENSIONS

ORIGIN OF THE INVENTION

The invention described herein was made in the performance of work under a NASA contract, and is subject to the provisions of Public Law 96-517 (35 U.S.C. Section 202) in which the Contractor has elected not to retain title.

TECHNICAL FIELD

The invention relates generally to directional waveguide structures and, more particularly, to a method for estimating the dimensions of directional waveguide coupling structures.

BACKGROUND ART

In order to determine the transmission characteristics of a waveguide directional coupler, it is necessary to first determine the size and location of couplings within the waveguide. Often the size and location of such couplings are unknown. However, the couplings are in the interior of the waveguide and are obscured from view and, hence, the size and location of the couplings cannot be visually determined.

Conventionally, the size and location of waveguide couplings are determined by X-ray techniques. However, such X-ray measurements are expensive to obtain and time consuming to perform, and often do not reliably determine the absolute size and location of the waveguide couplings.

STATEMENT OF THE INVENTION

Accordingly, it is an object of the invention to provide an inexpensive and reliable method for determining the size and location of couplings within a waveguide directional coupler.

It is another object of the invention to provide a method for determining the size and location of waveguide couplings within a waveguide directional coupler without the need for dismantling or otherwise opening the waveguide.

It is yet another object of the invention to provide a method for measuring the size and location of waveguide couplings in a waveguide directional coupler without requiring X-ray techniques.

These and other advantages of the invention are achieved by using a fine particulate substance to adhere to an adhesive placed against the couplings.

In accordance with a preferred embodiment, the invention provides a method for estimating the size and location of couplings in a waveguide directional coupler having first and second waveguides connected by a plurality of bore hole couplings, wherein the method comprises the steps of: applying an adhesive to a side surface of a member, with the member having a cross-sectional dimension smaller than an interior cross-sectional dimension of the first waveguide of the waveguide directional coupler; inserting the member into the first waveguide to dispose the side surface of the member adjacent to the bore hole couplings separating the first waveguide and the second waveguide; inserting a fine particulate substance into the second waveguide such that a portion of the substance enters the bore hole couplings and adheres to portions of the side surface of the member; withdrawing the member from the first waveguide; and measuring the size and relative location of the bore hole couplings by measuring the size and relative location of the portions of the adhesive adhered to by the fine particulate substance.

Also, in accordance with a preferred embodiment of the invention, the adhesive is two-sided tape and the fine particulate substance is talc. Also in accordance with the preferred embodiment, the member is itself a waveguide. Upon insertion into the first waveguide, wedges are inserted between the member and the first waveguide to thereby secure the member within the first waveguide.

The method can be applied to most waveguide directional couplers, including those having rectangular, cylindrical, or elliptical cross-sections.

Thus, the invention provides a simple, inexpensive, and reliable method for quickly determining the size and location of couplings within a waveguide coupler without requiring dismantling or destroying the coupler, and without requiring any expensive and elaborate X-ray techniques.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DETAILED DESCRIPTION OF THE INVENTION

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a method for the nondestructive estimation of a waveguide directional coupler.

The method of the invention will be described primarily with reference to FIGS. 1*a* through 1*e* showing the method applied to a waveguide directional coupler 10.

Figure 2:
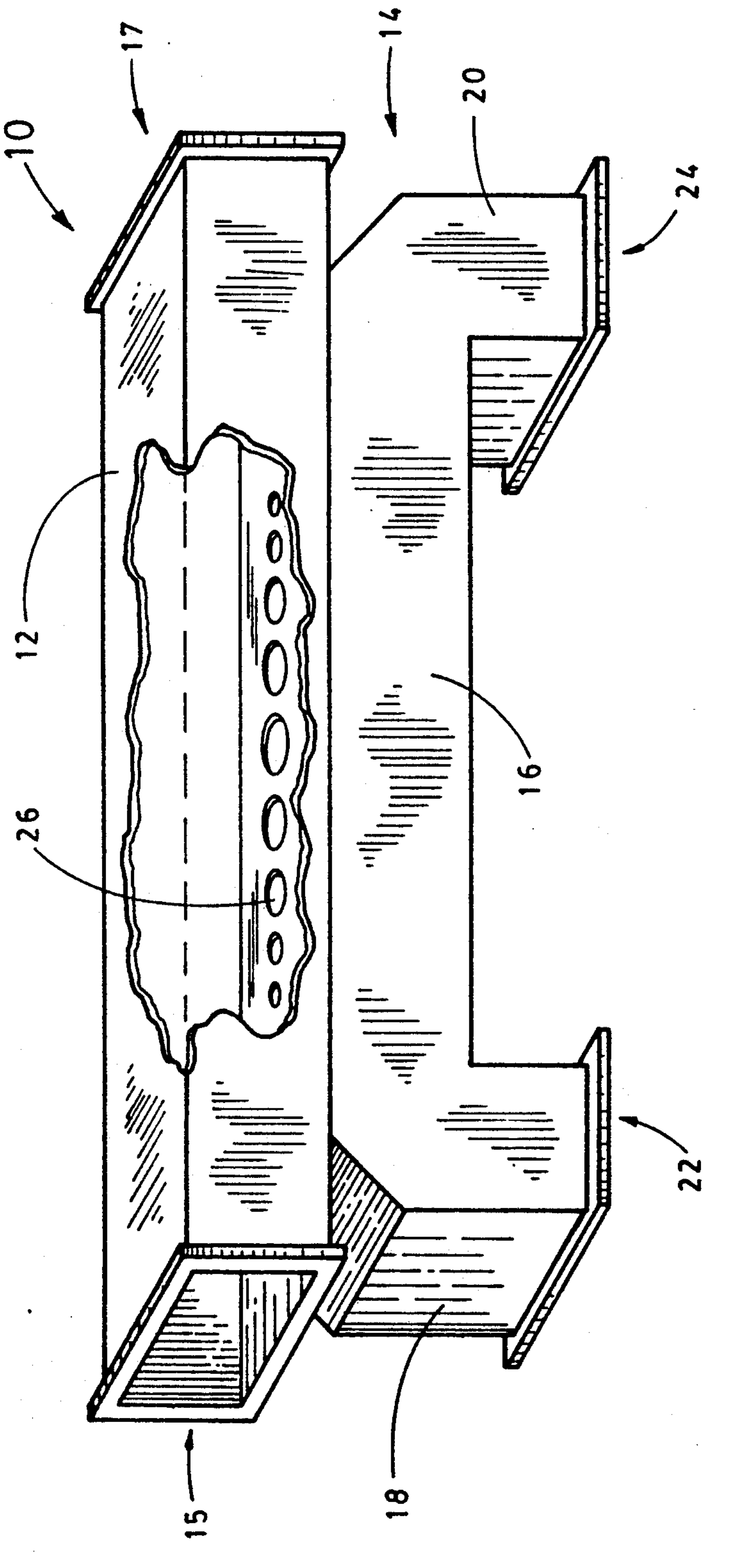
FIG. 2 shows a perspective view of a rectangular waveguide directional coupler.

Waveguide coupler 10, shown most clearly in FIG. 2, includes a generally rectangular main transmission waveguide 12 having open ends 15 and 17. Mounted to a side surface of main transmission waveguide 12 is an auxiliary transmission waveguide 14. Auxiliary transmission waveguide 14 comprises a contiguous member 16 (contiguous with main transmission waveguide 12) and first and second perpendicularly-extending waveguides 18 and 20 having open ends 22 and 24, respectively.

A series of bore hole couplings 26 connect main transmission waveguide 12 to contiguous member 16 to provide electromagnetic coupling of main transmission waveguide 12 to auxiliary waveguide 14.

Auxiliary waveguide 14 is securely mounted to, or integrally formed with, main transmission waveguide 12. Since bore hole couplings 26 are formed inside waveguide directional coupler 10, it is difficult or impossible to visually measure the size and location of bore hole 26 within waveguide directional coupler 10.

A simple and reliable method for measuring the size and location of bore hole couplings 26 is shown in FIGS. 1*a* through 1*e*.

Figure 1A:
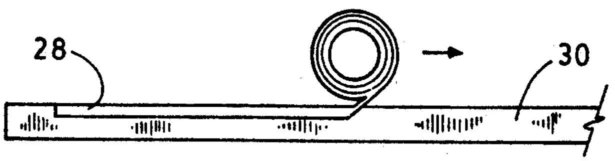
FIG. 1*a* is a side elevational view of a member being wrapped with two-sided tape in accordance with a step of the invention.

Referring to FIG. 1*a*, a first step of the invention is represented. The first step involves applying a two-sided adhesive tape 28 to a longitudinal side surface of a rectangular member 30. Rectangular member 30 must have cross-sectional dimensions smaller than an internal cross-sectional dimension of main transmission waveguide 12. By using a rectangular member 10 of such relative size, member 10 can be easily inserted and removed from main transmission waveguide 12 without damaging or disrupting adhesive tape 28.

Figure 1B:
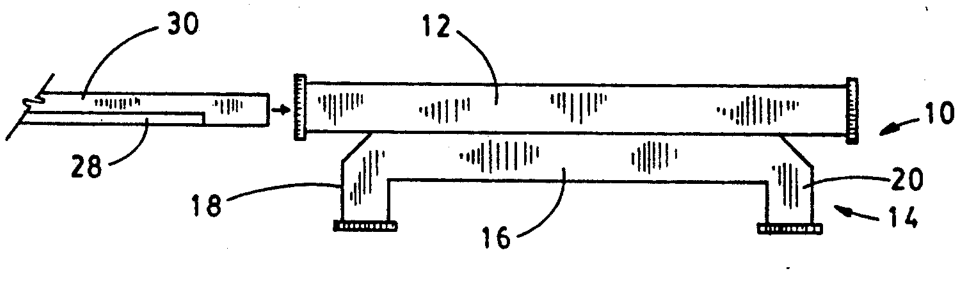
FIG. 1*b* is a side elevational view of the member of FIG. 1*a* inserted into a waveguide directional coupler in accordance with a step of the invention.

Referring to FIG. 1*b*, a second step of the invention is shown. The second step involves the insertion of rectangular member 30 into main transmission waveguide 12. Rectangular member 30 is oriented with respect to coupler 10 such that adhesive 28 is disposed adjacent to bore hole couplings 26. Since the precise location of bore hole couplings 26 may be unknown, adhesive 28 preferably covers a sufficient amount of rectangular member 30 such that, upon insertion, adhesive 28 covers the entire coupling area where contiguous member 16 is mounted adjacent to main transmission waveguide 12.

Also preferably, during step 2, directional coupler 10 is oriented with extending members 18 and 20 pointing downward. This orientation allows rectangular member 30 to be easily inserted into main transmission waveguide 12, and then rested against bore hole couplings 26.

Figure 1C:
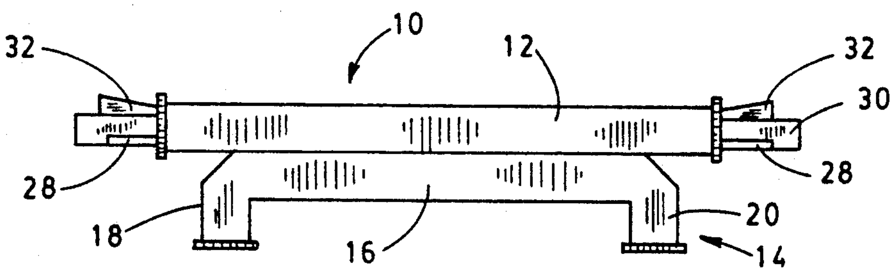
FIG. 1*c* is a side elevational view of the waveguide directional coupler with the member secured therein by wedges in accordance with a step of the invention.

Referring to FIG. 1*c*, a third step of the invention is shown, wherein wedges 32 are inserted into ends 15 and 17 of main transmission waveguide 12 for securing rectangular member 30 therein. Wedges 32 can comprise any suitable wedge material such as wood or plastic. As wedges 32 are inserted, rectangular member 30 is pressed against an internal side surface of main transmission waveguide 12 such that two-sided adhesive 28 is securely pressed against bore hole couplings 26.

Figure 1D:
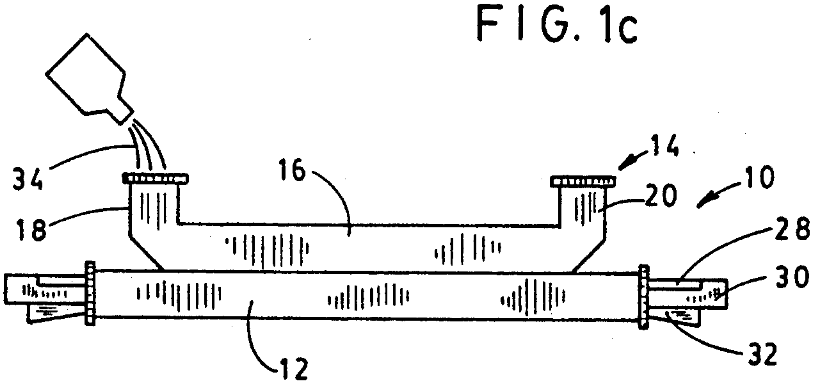
FIG. 1*d* is a side elevational view of the waveguide directional coupler with the member of FIG. 1*b* secured therein shown being filled with a fine particulate substance in accordance with a step of the invention.

Referring to FIG. 1*d*, a fourth step of the invention is shown. Waveguide directional coupler 10 is inverted such that extending members 18 and 20 point upward and a fine particulate substance 34 is poured into openings 22 and 24 of extending members 18 and 20, respectively. Fine particulate substance 34 can comprise any suitable fine material, but preferably comprises talc. A sufficient amount of fine particulate substance 34 is poured into waveguide directional coupler 10 such that contiguous member 16 is substantially filled. Particulate substance 34, once poured into waveguide directional coupler 10, enters bore hole couplings 26, and a portion of the particulate substance adheres to adhesive 28. If not enough particular matter is poured into waveguide directional coupler 10 to completely fill contiguous member 16, it is preferred that waveguide coupler 10 be shaken back and forth such that portions of particulate substance 34 adequately enter all bore hole couplings 26.

Although not shown in the figures, waveguide directional coupler 10 is preferably inverted such that fine particulate substance 34 pours out of auxiliary waveguide 14, leaving auxiliary waveguide 14 substantially empty except for any particles adhering either to adhesive 28 or to the interior walls of auxiliary waveguide 14.

Figure 1E:
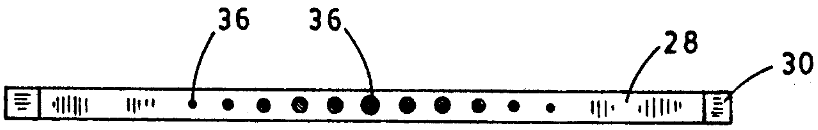
FIG. 1*e* is a plan view of the member of FIG. 1*a* showing the member with fine particulate substance marks identifying the size and location of bore hole couplings within the waveguide directional coupler of FIG. 1*b* for measurement thereof in accordance with a step of the invention.

Referring to FIG. 1*e*, a final step of the invention is shown. Wedges 32 are removed, and rectangular member 30 is carefully withdrawn from main transmission waveguide 12. As seen in FIG. 1*e*, a series of marks extend along adhesive 28, with the marks being formed from fine particulate substance 34 adhering to adhesive 28 within bore hole couplings 26. The size, shape, and location of marks 36 are easily measurable with conventional means such as a ruler, to thereby provide measurements of the size, shape, and location of bore hole couplings 26 within directional waveguide 12.

Waveguide coupler 10 can be cleaned by using water, forced air, or the like.

Thus described, the method of the invention provides a simple, inexpensive, and reliable method for determining the internal coupling structure of a waveguide directional coupler. Although shown with respect to a rectangular waveguide, the method can be applied to other waveguide geometries as well, including waveguides having cylindrical or elliptical cross-sections.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

I claim:

1. A method for estimating the size and location of couplings in a waveguide directional coupler, said method comprising the steps of:

placing an adhesive against the couplings; and pouring a fine particulate substance into the waveguide coupler for adhering to the adhesive within the couplings.

2. A method for estimating the size and location of couplings in a waveguide directional coupler, said waveguide coupler having first and second adjacent waveguides connected by a plurality of bore hole couplings, said method comprising the steps of:

applying an adhesive to a side surface of a member, said member having a cross-sectional dimension smaller than an interior cross-sectional dimension of the first waveguide;

inserting said member into said first waveguide to dispose said side surface adjacent to said bore hole couplings connecting said first waveguide to said second waveguide;

inserting a fine particulate substance into the second waveguide such that a portion of said substance enters said bore hole couplings and adheres to portions of said adhesive on the side surface of said member;

withdrawing said member from said first waveguide; and measuring size and relative location of said bore hole couplings by measuring size and relative location of said portions of said adhesive adhered to by said substance.

3. The method of claim 2, wherein said step of applying an adhesive to a side surface of said member comprises the step of applying two-sided tape to said side surface.

4. The method of claim 2, wherein said adhesive is applied along a longitudinal portion of said side surface.

5. The method of claim 2, wherein said step of inserting said member into said first waveguide further comprises the step of inserting wedges into said first waveguide adjacent to said member to secure said member within said first waveguide.

6. The method of claim 2, wherein said step of inserting said member into said first waveguide is performed with said directional coupler oriented with said first waveguide above said second waveguide and wherein said step of inserting said fine particulate substance is performed with said second waveguide above said first waveguide.

7. The method of claim 2, wherein said fine particulate substance is talc.

8. A method for estimating the size and location of couplings in a waveguide directional coupler, said waveguide coupler having first and second adjacent waveguides connected by a plurality of bore hole couplings, with said first waveguide being a main transmission line, and with said second waveguide being an auxiliary transmission line, with said second waveguide comprising a contiguous waveguide contiguous with a portion of said first waveguide and having two perpendicularly-extending waveguide sections extending outward from said first waveguide, said method comprising the steps of:

applying an adhesive to a side surface of a member, said member having a cross-sectional dimension smaller than an interior cross-sectional dimension of the first waveguide of the waveguide directional coupler;

inserting said member into said first waveguide to dispose said side surface adjacent to said bore hole couplings connecting said first waveguide to said second waveguide;

orienting said waveguide directional coupler with said perpendicularly-extending waveguides vertically disposed;

inserting a fine particulate substance into one of the perpendicularly-extending waveguides such that a portion of said substance enters said contiguous portion of said auxiliary waveguide and enters said bore hole couplings and adheres to portions of said adhesive on said side surface of said member;

withdrawing said member from said first waveguide; and measuring size and relative location of said bore hole couplings by measuring size and relative location of said portions of said adhesive adhered to by said fine particulate substance.

9. The method of claim 8, wherein said step of applying an adhesive to a side surface of said member comprises the step of applying two-sided tape to said side surface.

10. The method of claim 8, wherein said adhesive is applied along a longitudinal portion of said side surface.

11. The method of claim 8, wherein said step of inserting said member into said first waveguide further comprises the step of inserting wedges into said first waveguide adjacent to said member to secure said member within said first waveguide.

12. The method of claim 8, wherein said fine particulate substance is talc.

13. The method of claim 8, wherein said first and second waveguides have a rectangular cross-section.

* * * * *